United States Patent [19]

Lange et al.

[11] 4,309,463
[45] Jan. 5, 1982

[54] PRODUCTION OF MOLDED POLYMER BODY WITH METAL INCLUSIONS

[75] Inventors: Wolfgang Lange, Obernburg; Klaus Gerlach, Obernau, both of Fed. Rep. of Germany

[73] Assignee: Enka AG, Wuppertal, Fed. Rep. of Germany

[21] Appl. No.: 156,051

[22] Filed: Jun. 3, 1980

Related U.S. Application Data

[62] Division of Ser. No. 14,572, Feb. 23, 1979, Pat. No. 4,244,824.

[30] Foreign Application Priority Data

Feb. 27, 1978 [DE]  Fed. Rep. of Germany ....... 2808293

[51] Int. Cl.$^3$ ............................................. B05D 3/04
[52] U.S. Cl. ..................................... 427/343; 427/337; 427/243; 427/244; 260/37 M; 106/193 M; 210/645; 210/500.2; 252/477 R
[58] Field of Search ...................... 210/500.2; 427/337, 427/448, 343, 243, 244

[56] References Cited

U.S. PATENT DOCUMENTS 3,846,236  11/1974  Updike ................................. 422/46
3,996,141  12/1976  Updike ................................. 427/245

*Primary Examiner*—George F. Lesmes
*Assistant Examiner*—E. Rollins Buffalow
*Attorney, Agent, or Firm*—John H. Shurtleff

[57] ABSTRACT

A molded polymer body with very fine, discrete, solid particles composed of a metal, metal compound or a mixture of the same incorporated within the molded body in a uniform pattern of distribution, substantially free of agglomerations, as obtained by a process of first impregnating the molded body with a bath solution of a metal compound and then gassing the molded body with a gaseous precipitating agent to precipitate the metal-containing particles. The products are especially useful in catalytic membranes, e.g. as used in artificial lungs or artificial kidneys.

11 Claims, 2 Drawing Figures

PRODUCTION OF MOLDED POLYMER BODY WITH METAL INCLUSIONS

This is a division of application Ser. No. 14,572, filed Feb. 23, 1979, now U.S. Pat. No. 4,244,824.

BACKGROUND OF THE INVENTION

This invention relates to molded bodies or shaped articles which contain metals and/or metal compounds as inclusions in very finely divided form. The invention is also directed to a process for the production of these molded bodies having such inclusions.

The inclusion or embedding of relatively inert compounds into molded polymer articles has been known for a long time. In general, additives such as pigments or the like are incorporated into the polymer during its initial formation or in a premolding mixing and extrusion procedure. The best known process of this type is the spin-dyeing or delustering of polymer filaments and films. For this purpose, there are used a number of pigments readily available on the market, such as titanium dioxide, aluminum oxide, aluminum silicate, zinc sulfide, etc.

The particle size of these additives lies on the order of a few microns ($\mu$). If a smaller size is required, it is necessary to subject the particulate mass to a comminution process, for example, by milling for a relatively long time in a bead mill or a similar grinding or pulverizing means. In general, particle sizes are reduced in this manner to approximately one $\mu$.

For a particular purpose, namely for catalytic membranes, another process for the incorporation of certain compounds into the membrane has become known. Thus, permeable membranes are described in U.S. Pat. Nos. 3,846,236 and 3,996,141 which contain a catalyst for the decomposition of hydrogen peroxide into water and molecular oxygen. Such membranes are especially suitable for use in artificial lungs.

As is also known from the cited state of the art, suitable membranes are those made of water-insoluble, water-wettable cellulose derivatives such as cellophane (cellulose regenerated according to the viscose process), cellulose ester, carboxymethyl cellulose and also insolubilized gelatin or partly hydrolyzed polyvinyl acetate. Suitable catalysts to be incorporated in the membrane include manganese dioxide, ruthenium oxide or sulfide, and silver, gold or platinum particles.

For the production of catalyst membranes which contain ruthenium oxide, one process is described in U.S. Pat. No. 3,996,141, wherein the membrane is treated simultaneously on one side with a metal salt solution, e.g. with a ruthenium chloride solution and on the other side with an alkali hydroxide solution. In this manner, a shaped or molded body is obtained in which there has been incorporated or embedded a metal oxide and especially ruthenium oxide.

A number of difficulties have become apparent when working according to the known process. In particular, the known process does not permit a continuous production of these types of membranes. Thus, the incorporation of the oxide into the membrane does not proceed quickly enough due to the relatively slow diffusion of the liquid into the solid body. The corresponding long residence time of the membrane in the aqueous NaOH solution has a bad influence on the mechanical properties of the membrane, in particular causing a reduction in its strength. Furthermore, in order to avoid troublesome oxide precipitations in the metal salt bath, any mixing of the metal salt solution with the alkali hydroxide must be prevented. This is especially difficult in carrying out a continuous process, since the membranes used here as sealing surfaces or separating means must also be moved through the bath.

With a sequential arrangement of the treatment baths, problems arise through the carrying off of metal salt solution from the first bath into the following alkali bath, especially with reference to maintaining a clean and carefully supervised process. On account of the permanent alkali depletion in the precipitation bath in a continuous process, it is difficult to maintain over extended periods of time those constant precipitation conditions which are necessary to achieve a homogeneous inclusion of the metal oxide.

In general, the processes known in the prior art do not lead to satisfactory results, especially under continuous operation, and the final products have a poor distribution of the fine particles, lacking any uniform pattern of distribution. Moreover, the mechanical strength or stability of the resulting catalytic membrane is often insufficient to prevent a tearing or breaking open of the membrane when placed in actual use.

SUMMARY OF THE INVENTION

It is an object of the present invention to provide a molded polymer body in which metals and/or metal compounds have been incorporated in a very fine and homogeneous distribution. It is also an object of the present invention to provide a process for the production of such molded polymer bodies having an inclusion of metals and/or metal compounds wherein the process is suitable for continuous production and has none of the above-mentioned disadvantages of earlier processes. Other objects and advantages of the invention will become more apparent from the disclosure which follows.

In accordance with the invention, it has been possible to achieve a molded polymer body into which solid particles composed of a metal, metal compound or a mixture of the same have been incorporated as a finely divided inclusion, substantially free of particle agglomerates and with individual particles distributed in a uniform pattern extending from at least one surface of the molded body, as essentially produced by impregnating through said at least one surface of said molded polymer body with a solution of a reactive metal compound and then precipitating fine metal-containing particles within the molded body by means of a gaseous precipitating agent introduced through said at least one surface by direct gassing. In order to obtain a useful product, e.g. such as a catalytic membrane, it is important to avoid high concentrations of the individual particles, especially agglomerates but also highly densified layers or strata of particles within the molded body. The uniform particle pattern of distribution according to the present invention is essentially one in which the particles are discrete and separate from one another while being distributed with a gradual variation in density as viewed in layered cross-sections parallel to or conforming with an impregnated surface of the molded body. A completely uniform and homogeneous distribution of the particles within the molded polymer body represents an optimum result, and this result is reasonably approximated by the present invention, it being understood that a gradual variation of particle density is permissible as long as a uniform pattern, free of particle agglomerates, is maintained within the molded body.

The process of the invention for producing the molded polymer body with inclusions of fine solid particles composed of a metal or a metal compound or mixtures thereof requires the sequential steps of: (a) impregnating the molded polymer body through at least one surface thereof with a liquid solution containing a reactive metal compound; and (b) introducing a gaseous precipitating agent by direct gassing through the at least one impregnated surface of said molded body for reaction with the reactive metal compound to precipitate fine metal-containing particles within the molded body. The gaseous precipitating agent is preferably a lower boiling base or a lower boiling compound of elements of Group VI of the periodic system. Among these, the lower boiling base is most advantageously ammonia or an amine base. Other preferred gaseous precipitating agents include hydrogen sulfide or the corresponding hydrogen selenide or telluride. In general, the gaseous precipitating agent is one that will be selected for its convenience in providing a commercial application of the process and also in providing a specific metal compound as first precipitated within the molded polymer body.

THE DRAWINGS

The process of the invention is illustrated in the accompanying drawing in which:

FIG. 1 is a schematic flow sheet representation of the process according to the invention for treating the molded polymer body as a sheet material or as a tubular foil; and FIG. 2 is another schematic flow sheet illustrating the process of the invention for treating the molded polymer body in the form of a hollow filament.

The arrangement shown in FIG. 1 is used in Example 1 below while the arrangement of FIG. 2 is used in Examples 2 and 5 below.

DETAILED DESCRIPTION OF THE INVENTION

Figure 1:
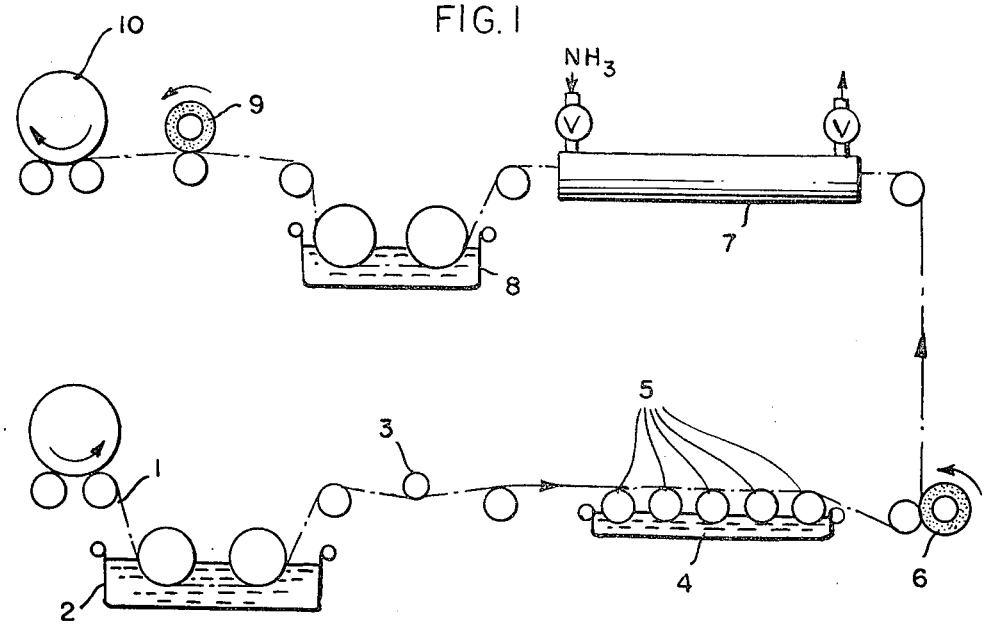

In principle, the invention is not restricted to any specific shape or form of the molded polymer body. Any product capable of being molded from a polymer may therefore be considered, such as spheres, prisms and cylinders of any size as well as profiled articles, tubes, plates, filaments, foils and the like, including those instances where the metal salt solution and the gaseous precipitating agent can act only on one side of the molded body. For the support or improvement of the mechanical properties of the molded body, it can include or be attached to other structural materials, for example other polymers with or without reinforcing members, metal parts, structural backings or the like.

As polymers, one may consider using any polymer which is wetted by the metal salt solution and capable of being surface impregnated by the liquid used as the metal-containing solution. It is even possible to use hydrophobic polymers in a polar solvent such as water if the polymer can be made hydrophilic or at least wettable and impregnable by suitable measures, as for example by swelling, foaming, etc. In particular then, if aqueous metal salt solutions are preferably used for commercial or other reasons, it is desirable to use hydrophilic or water-wettable polymers. Readily accessible and preferred polymers of such hydrophilic properties are regenerated cellulose, polyurethanes, cellulose esters and especially a cellulose acetate, polyvinyl alcohol, polyvinyl acetals, or polycarbonates such as polyether carbonate.

Suitable metals and/or metal compounds to be incorporated into the polymer bodies of the invention are selected on the one hand for their desired effect, e.g. as a catalyst, and on the other hand for their property of being precipitated by a gaseous precipitating agent. It is possible to select from a wide choice of metals and/or metal compounds since they are generally capable of being precipitated in the form of oxides, hydroxides, sulfides or the like, and may be further reduced in situ to the metal itself. The metal salt solutions used as an impregnating bath according to the invention can also contain two or more different metal salts in admixture with each other.

It is possible for one skilled in this art to readily select those metal salts capable of being precipitated either by means of lower boiling bases, e.g. ammonia or amines, into their hydroxides or oxides, or by means of lower boiling compounds of elements of Group VI of the Periodic System, as for example, $H_2S$, $H_2Se$, $H_2Te$, mercaptans or selenium-organic compounds of sufficiently high vapor pressure, into the corresponding sulfides, selenides or tellurides. In case the metal has a tendency to form soluble complexes with ammonia, a precipitation with amines is generally possible. With some metals such as manganese, cobalt, nickel, copper, zinc, cadmium and mercury, an excess amount of ammonia should not be used. By treatment of these metals with trimethylamine, there is immediately obtained the hydroxide or oxide. Likewise, palladium and platinum do not react well with ammonia but do react in the desired manner with trimethylamine. By means of a simple test tube experiment, one can easily determine if a hydroxide or hydroxide will form and precipitate with any specific lower boiling base.

The term "lower boiling" is to be understood as being directed to individual substances or mixtures having a vapor pressure at the temperatures used in the process sufficiently great that they are in the gaseous state for treatment of the molded polymer body. In general, the boiling point at normal (atmospheric) pressure should be below the boiling point of water at normal pressure, i.e. below 100° C. Preferably the gaseous precipitating agent has a boiling point below room temperature, i.e. below about 20° C. at normal pressure.

The term "bases" within the meaning of the invention is to be understood as basic reacting substances which convert the metal salts by a precipitation reaction into oxides or hydroxides. In general, the preferred elements of Group VI of the Periodic System are oxygen, sulfur, selenium, and tellurium. One could also use polonium but it has little or no value for purposes of the invention because of its limited existence and its radioactivity.

The term "reactive metal compound" is used herein to generally refer to a metal salt or any metal compound which will dissolve in a suitable liquid impregnating solvent, usually water or a lower alkanol or mixtures thereof. The metal will be present in the impregnating bath liquid in its dissolved form and must also be "reactive" in the sense that it will undergo precipitation upon treatment with the gaseous precipitating agent. In all cases, the resulting precipitated compound may be further reduced to the metal by means of hydrogen or another reducing agent.

The reaction of the metal salt after its diffusion into the molded body, e.g. a membrane, with lower boiling compounds of Group VI elements, e.g. hydrogen sulfide, takes place analogously to the reaction with lower boiling bases such as with ammonia or amines. In the case of using hydrogen sulfide, excess amounts of this precipitating agent can be used without any problem since the sulfides of the metals precipitated with $H_2S$ are not soluble in the presence of excess hydrogen sulfide.

In carrying out the process of the invention, the metal oxides or hydroxides can be precipitated first in the above-described manner within the molded body and then converted into the corresponding sulfide by a subsequent gassing with hydrogen sulfide. With a number of metal compounds, such a two-stage process is even essential, e.g. in those instances in which a precipitation of the sulfide occurs only in the alkaline range. As one example of this two-stage procedure, the precipitation of iron sulfide may be considered. Since an iron chloride solution has an acid reaction, a direct gassing of iron chloride with hydrogen sulfide does not lead to the precipitation of iron sulfide. Instead, there becomes incorporated in the molded body the sulfur which arises from the partial decomposition of the hydrogen sulfide in an acid medium. To avoid this, the molded body impregnated with an iron chloride solution is first gassed with ammonia and then with gaseous hydrogen sulfide, whereby there is first observed a milky-white coloration due to precipitation of iron hydroxide and then a subsequent conversion into the greenish-black iron sulfide.

In a similar manner, it is likewise possible to precipitate sulfides of the metals Pd, Pt and Ru out of the Group VIII transition elements by gassing the metal salt impregnated molded body with hydrogen sulfide. In using aqueous metal salt solutions for impregnating the molded polymer body and with a predetermined excess of hydrogen sulfide, there is obtained as inclusions in the molded body not only a sulfide precipitate but also a more or less well-defined metal mirror effect depending upon the reaction conditions. This mirror effect is due to the reducing capacity of the hydrogen sulfide, causing at least a partial reduction of the precipitate to very fine metal particles. If this effect is undesirable, then it may be avoided if an alcoholic solution, especially an ethanolic solution, is used in place of the aqueous solution of the metal salt. On the other hand, if a precipitation of the metal is desired, it is further possible to add as the last stage of the process a reduction step, for example by gassing with hydrogen or another gaseous reducing agent.

The above-noted two-stage treatment, first with ammonia or an amine and then with hydrogen sulfide, is especially advantageous for the production of membranes containing ruthenium sulfide which, just as the ruthenium oxide-containing membranes, are suitable for the decomposition of hydrogen peroxide into molecular oxygen and water.

According to the invention, the molded polymer body impregnated with a metal salt can also be subjected to treatment with a mixture of gases, e.g. a mixture of ammonia or amine and hydrogen sulfide. A further treatment with a reducing agent such as hydrogen is preferably carried out separately in a final gassing stage.

Apart from the use of the invention for incorporating finely divided metals or metal oxides, hydroxides, sulfides, etc., into molded polymer bodies of specific transparency so as to provide a specific coloration, a mirror effect or the like, the working methods taught herein are also valuable for the recovery of metals, metal oxides, sulfides, etc., which are obtained with exceptionally small particle sizes. Depending upon the polymer, the metal or metal compound such as the oxide or sulfide can be easily separated by decomposing or dissolving away the polymer and retaining only the metal or metal compound as a fine powder or dust.

The molded polymer body, when produced according to the present invention, exhibits a very fine homogeneous distribution of embedded or included particles of the metal and/or metal compounds, wherein the particle size lies between about $0.005\mu$ and $0.05\mu$, preferably between about $0.005\mu$ and $0.01\mu$.

The products of this invention are especially significant, however, for use as catalytic membranes and in this case as special membranes which can be used in artificial organs such as artificial lungs. These membranes preferably contain, as inclusions, finely divided particles of manganese dioxide, collodial silver or chelated iron, platinum, silver and gold, and especially ruthenium oxide and ruthenium sulfide.

If these molded bodies of the invention are utilized as membranes for oxygen transfer with blood, the service life up to membrane deactivation amounts to about 3 hours. This service life can be considerably increased however, and indeed up to about 20-24 hours, if in the production of the metal salt solution there is added an unsubstituted and/or substituted phenol in an amount of about 5 to 20% by weight with reference to the metal as dissolved in the impregnating bath, i.e. in the metal salt solution.

Similar longer service lives, i.e. until deactivation of the membrane, can also be achieved for membranes prepared according to the invention for oxygen transfer with blood, provided that in place of a phenol there is added a small amount of boric acid to the metal salt solution, i.e. about 5 to 20% by weight of boric acid with reference to the metal in the solution. In this case also the service life is distinctly higher than 20 hours.

It is thus a particular object of the invention to provide useful and improved catalytic membranes as most desirably produced in a continuous process of impregnating suitable endless molded bodies such as flat sheets or films, tubular foils or hollow filaments, e.g. as made from a hydrophilic or water-wettable polymer, with an aqueous and/or alcoholic solution of ruthenium chloride and then gassing with ammonia to form ruthenium oxide or with a hydrogen sulfide/ammonia mixture to form ruthenium sulfide. The advantages of the process of the invention are not restricted solely to the production of these preferred membranes containing ruthenium oxide or ruthenium sulfide but rather are found to be generally applicable regardless of the shape of the molded body or its intended utility.

The membranes obtained by the invention have been examined under an electron microscope whereby it was determined that the embedded particles of metals, metal compounds or mixtures thereof are incorporated in a very uniform and even distribution and with a very small particle size, thereby providing a much larger active particle surface in the molded body. Such uniformity of particle distribution is at least symmetrical to the center or longitudinal centroidal plane of the membrane and approximates the ideal homogeneous distribution of microscopic discrete particles within the membrane.

Membranes which have been prepared by the batch process of U.S. Pat. No. 3,996,141 exhibit a completely different structure under the electron microscope. In these prior membranes, the outermost layers or peripheral portions at the outer surface of the membrane are completely free of embedded metal compounds. However, in a more central portion of the wall thickness of the membrane, about one-quarter to one-third of this wall thickness contains all of the metal compound particles in a clearly observed band in which the particles lie very close to each other and partly form large agglomerates. The size of the particles fluctuates to a considerable degree and cannot be determined with any accuracy inside the molded body because the particles appear in the form of a veil or screen marked off poorly from the background or are seen as a compact, dense, homogeneous layer of closely packed particles.

With various other metals, their oxides, sulfides, selenides, etc., all of which are catalytically active, it is frequently of advantage with reference to the size of the exposed particle surfaces and the activity of the catalyst if the particles are on the one hand very finely divided but on the other hand are "fixed". For example, better catalysts can be provided with the products of the invention when formed as filaments, cut fibers, bands, foils, tubes, profiles or the like containing the catalytically active particles incorporated therein as compared to a fine catalyst powder. Such catalysts made with the molded polymer bodies having inclusions according to the invention have an especially large active surface but do not cause the difficulties known with powders, e.g. caking or agglomeration and/or turbulent fluidization.

The production of the molded bodies according to the invention is possible at relatively low cost even when carried out continuously as required for commercial production. For example, the molded body such as a flat film or a folded flat tubular foil is simply conducted through an aqueous or alcoholic metal salt bath, or over a series of godets sufficient for thorough impregnation, these godets being partly immersed in a bath containing the metal salt solution.

The amount of metal salt which is introduced into the molded body is dependent upon the residence time, i.e. the length of time during which the molded body or its wetted surface remains in contact with the bath liquid. As a rule, this residence time is adjusted by the draw-off speed of the molded body, especially by careful regulation of the speed of the draw-off device such as godets and winding rolls. It is self-understood that it is necessary to adjust the process conditions for each polymer material and the shape of the molded body. After impregnating with the metal salt solution, the excess liquid is stripped off and the molded body then run through a chamber in which direct gassing takes place with a gaseous precipitating agent.

The process of the invention is further illustrated by a few working examples which are directed to especially preferred embodiments of the invention and which lead to very desirable membrane products. The invention is not limited to these examples.

EXAMPLE 1

The production of a catalytic membrane containing a finely divided ruthenium oxide is explained in connection with FIG. 1. In this embodiment, a flat sheet or foil 1 of regenerated cellulose, as produced by the cuprammonium process, is first conducted through a wetting bath 2 and then over a system of godets 5 which run in a bath 4 containing an aqueous ruthenium chloride solution. The tension of the flat foil being transported is maintained constant by a roller arrangement which includes the "dancer" roll 3 which operates in a known manner in placing a resilient, adjustable tension on the transported material. The excess bath solution adhering to the flat foil 1 is then removed by means of a foamed plastic or sponge rubber roller 6 turning in a direction against the foil transport. Thereafter, the flat foil is conducted into a gassing chamber 7 in which the foil impregnated with the ruthenium chloride solution is gassed, for example with a continuous stream of 500 liters/hour of ammonia (as measured under normal conditions of 20° C., 1 atm.). After leaving the gassing chamber, the flat foil is washed in a water bath 8 in order to separate as completely as possible the ammonium chloride formed in the precipitation reaction as well as the excess ammonia. Finally, the flat foil is dried with a foamed plastic or sponge rubber roller 9 and wound onto the usual winding device 10.

The amount of ruthenium salt and correspondingly the amount of ruthenium oxide introduced into the foil in this manner is influenced by various factors. Thus, the concentration of the included amounts of ruthenium oxide is understandably dependent upon the salt concentration in the bath. It is further possible, however, to influence the ruthenium oxide concentration in the foil by adjusting the speed of the godets and also by adjusting the running speed of the foil. It will be noted in FIG. 1 that the godets 5, which may be immersed up to about their axes of rotation, act to spread the bath liquid against the lower surface or underside only of the foil 1 which travels over the top periphery of each godet 5 in wetting contact therewith. Thus, the godets 5 and the foil 1 can be run at different speeds. The godets preferably have a bakelite or similar resin-coated surface to resist chemical attack and to provide a good wetting effect on the roller surface of each godet. Of course, the adsorption capacity of the foil itself plays a predominant role in the amount of ruthenium salt taken up in a given period of time.

In this example, where the thickness of the flat foil is 50μ and the foil is conducted at a speed of 0.5 meters/minute through the apparatus as shown in FIG. 1, then a membrane is obtained which contains 9.3% by weight of ruthenium with reference to the dry weight of the foil, provided that the concentration of the ruthenium chloride solution is 125 g/l ruthenium, the peripheral speed of the godets is 6 meters/minute, the bath temperature is 20° C. and ammonia is conducted through the gassing chamber 7 at a rate of 500 liters/hr (under normal conditions).

A suitable baffle can be arranged within the chamber 7 so that the gaseous precipitating agent, in this case ammonia can be introduced to flow along the same surface of the foil as that which contacted the godets 5 for impregnation over the bath 4. A countercurrent flow is indicated in FIG. 1 where ammonia enters at the foil outlet end of the chamber 7 and is withdrawn at the foil entry end. The ammonia is easily recycled for reuse in this continuous gas treatment. Instead of the washing bath 8, it is also feasible to conduct the impregnated and gassed foil through a wash tower or past a spray of wash water.

If the membrane containing ruthenium oxide as obtained in the foregoing manner by gassing with ammonia is then conducted through a second gassing chamber (not shown), for example so as to treat it with a stream of 300 liters/hr of hydrogen sulfide (under normal conditions), then a complete conversion of the ruthenium oxide into ruthenium sulfide occurs. In this conversion of the ruthenium oxide into the corresponding sulfide, the amount of ruthenium in the membrane remains unchanged.

The membranes obtained in this way are useful for installation into artificial lungs. It is a prerequisite for such a use that a hydrogen peroxide decomposition of at least 99.95% will be achieved and that the oxygen generation with use of a 0.25 percent hydrogen peroxide solution will amount to at least 170 ml/min.m$^2$. With membranes produced according to the invention, these requirements are fulfilled without any further modifications. With the above-described membrane which contains ruthenium oxide particles, the following values were determined in an artificial lung simulation:

Hydrogen peroxide decomposition = 99.98%
Oxygen generation = 187 ml/min.m$^2$.

After the additional gassing treatment with hydrogen sulfide to convert the ruthenium oxide into the corresponding sulfide, the following results were observed:

Hydrogen peroxide decomposition = 99.98%
Oxygen generation = 274 ml/min.m$^2$.

Optimum results are obtained when the membrane contains from about 0.4 up to about 1.8 g/m$^2$ of ruthenium.

EXAMPLE 2

Figure 2:
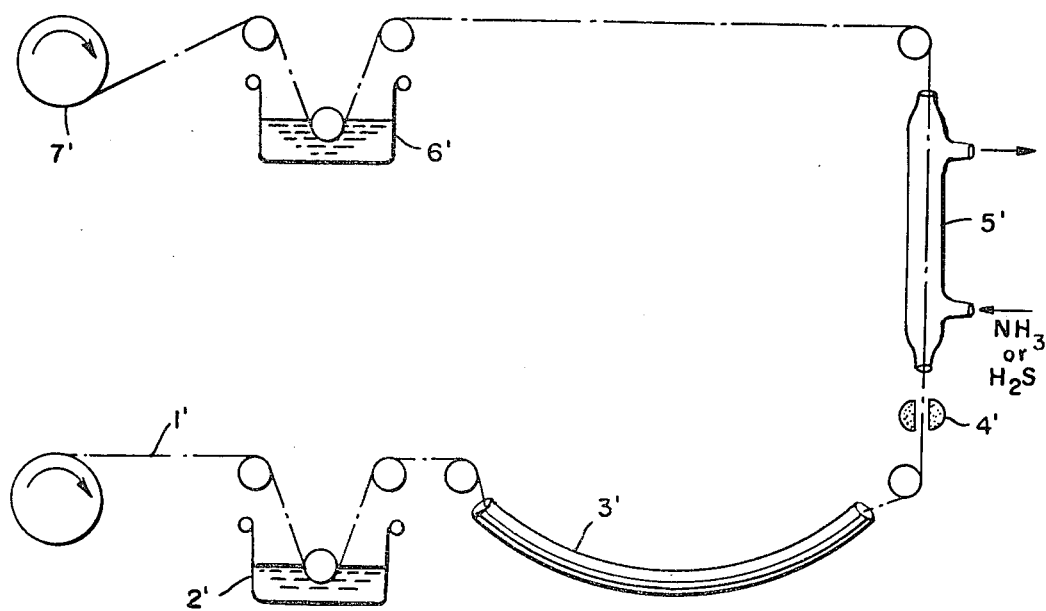

In an analogous manner, a molded polymer body in the form of a hollow filament is produced using the apparatus illustrated schematically in FIG. 2. A hollow filament 1' of regenerated cellulose, as produced by the cuprammonium process and with its hollow axial core being filled with isopropyl myristate, is conducted through a wetting bath 2' and then through the tube 3 in which there is situated an aqueous solution of ruthenium chloride. After leaving this aqueous treatment bath, the adherent excess metal salt solution is stripped off by the foamed plastic sponge 4' which can be pressed lightly around the entire circumference of the hollow filament. Then, the hollow filament 1' continuously runs through the gassing chamber 5' into which a constant stream of 20 liters/hr of ammonia or hydrogen sulfide is conducted, in this case concurrently with the running filament. After leaving the gassing chamber, the hollow filament is washed in a water bath 6' and is then wound up on a conventional winder or spooling device 7'. By using a hollow filament with a fiber diameter of 0.3 mm and a wall thickness of 0.03 mm and conducting it through a 20 percent ruthenium chloride solution at a linear filament speed of 1 meter/minute, and after a residence time of 1 minute in the ruthenium chloride solution and a shorter residence time of 30 seconds in the gassing chamber, the treated filament contains about 8% by weight of ruthenium incorporated in the membrane wall with reference to the dry weight of the filament.

While the foregoing description has been directed to a single hollow filament, it will be understood that it is preferable to use a plurality of hollow filaments loosely collected together as a hollow filament thread or yarn so that the outer peripheral surface of all filaments is uniformly contacted with the bath liquids and with the gaseous precipitating agent. If necessary, the bundle of filaments may be spread into a wide band of only one or two filaments in thickness to ensure full exposure of the filaments to the liquid and gas treating fluids.

This catalytic membrane in the form of a single hollow filament or preferably as a bundle of hollow filaments is also suitable for installation into artificial lungs because a sufficient hydrogen peroxide decomposition and oxygen generation are again guaranteed.

EXAMPLE 3

The molded polymer bodies according to the invention are also especially useful for another purpose with excellent results, namely for blood dialysis in artificial kidneys. In this case, the molded bodies are again used in the form of suitable membranes, for example as hollow filaments, incorporating aluminum hydroxide or zirconium hydrate as the finely dispersed particles. The resulting membranes containing these inclusions exhibit the known properties of separating metabolites and additionally show an outstanding adsorption capacity for phosphates.

The production of such a membrane can be accomplished in a manner analogous to the methods described above, provided that in place of a ruthenium chloride solution there is used an aqueous aluminum oxalate solution or a zirconium oxalate solution wherein the concentration amounts to 62.5 g/l, for example. The gassing is carried out with ammonia under the same conditions described above. After washing and then drying the hollow filaments at room temperature, a content of 1.5% by weight aluminum and 1.8% by weight of zirconium oxide were determined. In experiments under dialysis conditions, it was determined that a practically complete reaction of the embedded aluminum hydroxide into aluminum phosphate could be achieved.

EXAMPLE 4

As previously mentioned, the molded bodies of the invention are well suited as catalysts if they contain catalytically active metals, metal compounds or mixtures thereof. For example, by treating hydrophilic polyester threads or filaments, as described in the German Patent Specification No. 2,755,341, with a solution of copper sulfate (50 g/l) and after stripping off excess solution and gassing with hydrazine vapors, the resulting filaments contain copper in a very fine and uniform distribution. These filaments act as an outstanding catalyst for the separation of residual amounts of oxygen from inert gases. The catalyst is preferably used as a fibrous wadding, pad or mat and can be regenerated in the usual manner. With the help of such molded bodies according to the invention, used as a large surfaced catalyst, it is possible to purify nitrogen having a residual content of 1,000 ppm of oxygen down to an oxygen content of less than 1 ppm in a very convenient manner.

The foregoing examples demonstrate only a few aspects of the numerous areas of utility for the products of the invention. Molded bodies according to the present invention are exceptionally useful as reaction surfaces or as fixed bed surfaces if they are constructed from polymers in the form of vessels or containers, for example, as flasks, bottles, jars or cylinders with the walls thereof providing the catalytic or stabilizing effect on the substance placed in the container. For example, aluminum hydroxide incorporated as finely distributed particles into the walls of a container will act to prevent or inhibit the formation of ether peroxides.

EXAMPLE 5

Corresponding to Example 1 and using the apparatus of FIG. 1 again, a flat sheet or foil 1 of regenerated cellulose, as obtained by the cuprammonium process, is first conducted through wetting bath 2 and then over a system of godets 5 which run in a vat or tub 4 which contains an aqueous ruthenium chloride solution and also 10% by weight with reference to the ruthenium of phenol. The tension on the continuously running foil 1 is kept constant by the roller arrangement which includes the tensioning dancer roll 3. Analogously to Example 1, the flat foil or sheet is then treated at 7 with a continuously fed stream of 500 liters/hr of ammonia so as to gas the same surface initially impregnated with the ruthenium chloride/phenol solution. The gassed sheet is thereafter washed and dried and then wound onto a take-up spool.

The membrane obtained in this manner contained 9.3% by weight of ruthenium and was tested with hydrogen peroxide for its suitability in decomposing this substance. The following results were observed:

Hydrogen peroxide decomposition = 99.96%
Oxygen generation = 278 ml/min.m$^2$.

The characteristics of this membrane in the transfer of oxygen with blood was also tested. In this case, it was determined that the service life of the membrane until deactivated amounted to 23 hours. By comparison, the service life of the membrane according to Example 1 was only 3 hours.

In general, it is believed the present invention offers new and surprisingly useful catalytic or adsorbent materials as molded bodies or shaped articles from a number of useful polymers, the products being made available in a wide variety of sizes, shapes and forms adapted to specific end utilities. The detailed description herein covers a few of the most important utilities of these products and other similar utilities will be readily suggested to those skilled in the chemical arts, depending upon the particular metals and/or metal oxides incorporated into a given polymer body. Most importantly, the process of the invention yields a highly improved precipitation of the metal and/or metal compounds so as to offer a previously unattainable uniform pattern of particle distribution together with discrete particle sizes of not more than about 0.05$\mu$ and preferably less than 0.01$\mu$. Finally, these improvements are achieved without any serious damage or impairment of the properties of the polymer article, thereby offering especially attractive features in the production of very thin and semipermeable membranes as used in hemodialysis, artificial lungs and similar applications.

The invention is hereby claimed as follows:

1. A process for the production of a molded polymer body with inclusions of fine solid particles composed of a metal, metal compound or a mixture of the same, said polymer being gas-permeable, wettable and at least surface impregnable with a liquid solvent, which process comprises the steps of:
   impregnating said molded body through at least one surface thereof with a liquid solution containing a reactive metal compound; and
   introducing a gaseous precipitating agent by direct gassing through the at least one impregnated surface of said molded body for reaction with said reactive metal compound to precipitate fine metal-containing particles within the molded body.

2. A process as claimed in claim 1 wherein the gaseous precipitating agent is selected from the group consisting of a lower boiling base, a lower boiling compound of an element of Group VI of the Periodic System and mixtures thereof.

3. A process as claimed in claim 2 wherein the lower boiling base is selected from the group consisting of ammonia and amines.

4. A process as claimed in claim 2 wherein the gaseous precipitating agent is hydrogen sulfide.

5. A process as claimed in claim 2 wherein the gaseous precipitating agent is ammonia.

6. A process as claimed in claim 1 wherein the impregnating liquid is an aqueous or alcoholic solution of the reactive metal compound.

7. A process as claimed in claim 1 wherein the reactive metal compound is soluble in the impregnating liquid and is a compound of a metal selected from the group consisting of manganese, cobalt, nickel, copper, zinc, cadmium, mercury, platinum, palladium and ruthenium.

8. A process as claimed in claim 1 wherein the reactive metal compound is a ruthenium compound which is soluble in the impregnating liquid.

9. A process a claimed in claim 1 wherein there is added to the impregnating solution about 5 to 20% by weight, of an unsubstituted or substituted phenol, with reference to the weight of metal in the solution.

10. A process as claimed in claim 1 wherein there is added to the impregnating solution about 5 to 20% by weight of boric acid, with reference to the weight of metal in the solution.

11. A process as claimed in claim 6, 7 or 8 wherein the gaseous precipitating agent is selected from the group consisting of a lower boiling base, a lower boiling compound of an element of Group VI of the Periodic System and mixtures thereof.

* * * * *